(12) United States Patent
Weinstein et al.

(10) Patent No.: US 9,646,074 B2
(45) Date of Patent: *May 9, 2017

(54) METHOD FOR DISCOVERING RELATIONSHIPS IN DATA BY DYNAMIC QUANTUM CLUSTERING

(71) Applicants: The Board of Trustees of the Leland Stanford Junior University, Stanford, CA (US); Ramot at Tel Aviv University Ltd., Tel Aviv (IL)

(72) Inventors: Marvin Weinstein, Palo Alto, CA (US); David Horn, Tel Aviv (IL)

(73) Assignees: The Board of Trustees of the Leland Stanford Junior University, Stanford, CA (US); Ramot at Tel Aviv University Ltd., Tel Aviv (IL)

(*) Notice: Subject to any disclaimer, the term of this patent is extended or adjusted under 35 U.S.C. 154(b) by 75 days.

This patent is subject to a terminal disclaimer.

(21) Appl. No.: 14/482,961

(22) Filed: Sep. 10, 2014

(65) Prior Publication Data
US 2015/0032750 A1    Jan. 29, 2015

Related U.S. Application Data

(63) Continuation of application No. 12/586,036, filed on Sep. 15, 2009, now Pat. No. 8,874,412.
(Continued)

(51) Int. Cl.
*G06F 7/60* (2006.01)
*G06F 17/30* (2006.01)
*G06K 9/62* (2006.01)

(52) U.S. Cl.
CPC .. *G06F 17/30598* (2013.01); *G06F 17/30713* (2013.01); *G06K 9/622* (2013.01); *G06K 9/6247* (2013.01)

(58) Field of Classification Search
CPC ........ G06F 17/30598; G06F 17/30713; G06K 9/6247
(Continued)

(56) References Cited

U.S. PATENT DOCUMENTS 6,021,383 A * 2/2000 Domany .......... G06F 17/30705
                                                    382/225
7,260,259 B2 * 8/2007 Comaniciu ............ G06K 9/342
                                                    382/162
(Continued)

OTHER PUBLICATIONS

Yao et al. (Quantum Clustering Algorithm based on Exponent Measuring Distance, 2008, IEEE, pp. 436-439).*
(Continued)

*Primary Examiner* — Omar Fernandez Rivas
*Assistant Examiner* — Iftekhar Khan
(74) *Attorney, Agent, or Firm* — KPPB LLP

(57) ABSTRACT

Data clustering is provided according to a dynamical framework based on quantum mechanical time evolution of states corresponding to data points. To expedite computations, we can approximate the time-dependent Hamiltonian formalism by a truncated calculation within a set of Gaussian wavefunctions (coherent states) centered around the original points. This allows for analytic evaluation of the time evolution of all such states, opening up the possibility of exploration of relationships among data-points through observation of varying dynamical-distances among points and convergence of points into clusters. This formalism may be further supplemented by preprocessing, such as dimensional reduction through singular value decomposition and/or feature filtering.

18 Claims, 6 Drawing Sheets

Related U.S. Application Data

(60) Provisional application No. 61/198,621, filed on Nov. 7, 2008.

(58) Field of Classification Search
USPC .......................................................... 703/2
See application file for complete search history.

(56) References Cited

U.S. PATENT DOCUMENTS

| | | | | |
|---|---|---|---|---|
| 8,536,667 | B2* | 9/2013 | de Graff | H01L 27/14618 257/419 |
| 2004/0117403 | A1* | 6/2004 | Horn | G06F 17/30595 |
| 2007/0180586 | A1* | 8/2007 | Amin | G06N 99/002 257/9 |
| 2008/0059512 | A1* | 3/2008 | Roitblat | G06F 17/30705 |
| 2008/0147360 | A1* | 6/2008 | Fejes | G06F 19/16 703/2 |
| 2011/0313741 | A1* | 12/2011 | Langhoff | G06F 19/704 703/2 |
| 2012/0321204 | A1* | 12/2012 | Fertik | G06F 17/3071 382/225 |
| 2015/0046457 | A1 | 2/2015 | Weinstein et al. | |

OTHER PUBLICATIONS

Peter Wittek ("High-Performance Dynamic Quantum Clustering on Graphics Processors", Journal of Computational Physics,2012, pp. 1-20).*

Devitt et al. (High Performance Quantum Computing, 2008, arXiv, pp. 1-4).*

Wang et al. ("Solving SchrOdinger's equation around a desired energy: Application to silicon quantum dots",American Institute of Physics, 1994, pp. 2394-2397).*

Aimeur et al., "Quantum Clustering Algorithms", International Conference on Machine, Learning, 2007,pp. 1-8.

Alter et al., "Singular value decomposition for genome-wide expression data processing and modeling", PNAS, vol. 97, No. 18, Aug. 29, 2000, pp. 10101-10106.

Coifman et al., "Geometric diffusions as a tool for harmonic analysis and structure definition of data: Multiscale methods", PNAS, vol. 102, No. 21, May 24, 2005, pp. 7432-7437.

Golub, T. R., "Molecular Classification of Cancer: Class Discovery and Class Prediction by Gene Expression Monitoring", Science, vol. 286, Oct. 15, 1999, pp. 531-537.

Guleser, Demir, "Clustering Within Quantum Mechanical Framework, Springer-Verlag", Berlin Heidelberg 2005,pp. 182-187.

Horn, David et al., "Algorithm for Data Clustering in Pattern Recognition Problems Based on Quantum Mechanics", Phys. Rev. Lett. 88 (2001), 4 pgs., 018702-1-018702-4.

Jain et al., "Data Clustering: A Review", ACM Computing Surveys, vol. 31, No. 3, Sep. 1999, IEEE, 1996, pp. 1-60.

Klauder et al., "A Coherent-State Primer", World Scientific, Singapore, 1985, 121 pgs.

Lafon et al., "Diffusion Maps and Coarse-Graining: A Unified Framework for Dimensionality Reduction, Graph Partitioning and Data Set Parameterization", IEEE Trans. Pattern Anal. Mach. Intell. 28, 2006, pp. 1393.

Merzbacher, "Quantum Mechanics", 3rd ed., Wiley, New York, 1998.

Nadler et al., "Diffusion maps, spectral clustering and reaction coordinates of dynamical systems", Appl. Comput. Harmon. Anal., 21, 2006, pp. 113-127.

Oliveira et al., "A Privacy-Preserving Clustering Approach Toward Secure and Effective Data Analysis for Business Collaboration", ICDM, Nov. 2004, pp. 1-33.

Roberts, Stephen, "Parametric and Non-parametric Unsupervised Cluster Analysis", In press: Pattern Recognition, Apr. 1996, 23 pgs.

Sakurai, J.J, "Modern Quantum Mechanics", Addison-Wesley 1993,pp. 1-6.

Shuai, "Entanglement Partitioning of Quantum Particles for Data Clustering", Proc. 30th Intl. Computer Software and Applications Conference, 2006.

Shuai et al., "Self-Organizing Data Clustering Based on Quantum Entanglement Model", Proc. 1st Intl. Multi-Symposium on Computer and Computational Sciences, 2006.

Varshavsky et al., "Compact: A Comparative Package for Clustering Assessment", ISPA Workshops 2005, LNCS, vol. 3759, 2005, pp. 159-167.

Varshavsky et al., "Novel Unsupervised Feature Filtering of Biological Data", Bioinformatics, vol. 22, No. 14, 2006, pp. e507-e513.

Wolfe et al., "Learning From Text: Matching Readers and Texts by Latent Semantic Analysis", Discourse Processes, 25, 1998, pp. 309-336.

* cited by examiner

METHOD FOR DISCOVERING RELATIONSHIPS IN DATA BY DYNAMIC QUANTUM CLUSTERING

CROSS REFERENCE TO RELATED APPLICATIONS

This application is a continuation of U.S. patent application Ser. No. 12/586,036, filed Sep. 15, 2009, which claims the benefit of U.S. Provisional Patent Application No. 61/198,621, filed Nov. 7, 2008 and titled "Method for Discovering Relationships in Data by Dynamic Quantum Clustering", the disclosures of which are hereby incorporated by reference in their entirety.

GOVERNMENT SPONSORSHIP

This invention was made with US government support under contract number DE-AC02-76SF00515 awarded by the Department of Energy. The government has certain rights in this invention.

FIELD OF THE INVENTION

This invention relates to data clustering.

BACKGROUND

Clustering of data is a well-known problem of pattern recognition. For our purposes, data clustering can be formulated as follows. Given a set of data-points, one looks for possible structures by sorting out which points are close to each other and, therefore, in some sense belong together. In general, data clustering is often ill-defined in a mathematical sense. Nonetheless, it is a very important problem in many scientific and technological fields of study. Data clustering is a preliminary analysis stage taken before investigating what properties are common to these subsets of the data. Some known approaches for data clustering make use of physical modeling and intuition.

One example of such an approach is known as quantum clustering (as described in US 2004/0117403 and in an article by Horn et al., "Algorithm for Data Clustering in Pattern Recognition Problems Based on Quantum Mechanics", Phys. Rev. Lett. 88 018702 (2001), both of which are hereby incorporated by reference in their entirety). Briefly, in this approach, the data points are used to define a quantum state (e.g., this state can be composed of a linear combination of Gaussians centered at each data point). A potential function having this state as its ground state is calculated from the time-independent Schrödinger equation. The minima of this potential function provide helpful information for data clustering (e.g., in favorable cases, distinct minima of the potential function can identify the clusters). In this approach, there is a single scale parameter, which determines the scale at which cluster structures are identified.

In some cases, the performance of this quantum clustering approach can have an undesirably high sensitivity to the value of the quantum clustering scale parameter. Accordingly, it would be an advance in the art to provide data clustering having reduced parameter sensitivity. While the quantum wave function (i.e. Parzen function) can be quite sensitive to the choice of scale parameter, the details of the quantum potential are much less sensitive to this choice.

SUMMARY OF THE INVENTION

In the present work, quantum clustering is extended to provide a dynamical approach for data clustering using a time-dependent Schrödinger equation. To expedite computations, we can approximate the time-dependent Hamiltonian formalism by a truncated calculation within a set of Gaussian wave-functions (coherent states) centered around the original points. This allows for analytic evaluation of the time evolution of all such states, opening up the possibility of exploration of relationships among data-points through observation of varying dynamical-distances among points and convergence of points into clusters. This formalism may be further supplemented by preprocessing, such as dimensional reduction through singular value decomposition and/or feature filtering.

A method for data clustering is an embodiment of the invention. First, n data points are provided as an input to the method. Next, n initial states are defined corresponding to the n data points (e.g., each initial state can be centered on its corresponding data point). A potential function is determined such that a quantum mechanical ground state of the potential function is equal to the sum of the initial states. Quantum mechanical time evolution of the initial states in this potential function is calculated. Data point trajectories are determined from this time evolution (e.g., by computing the position expectations of the evolved states). Information (e.g., point positions, point separations etc.) derived from the trajectories is provided as an output. Preferably, this output is provided by way of an interactive color-coded visual display.

To better appreciate the present approach, it is helpful to compare it to diffusion geometry, which is a known dynamical framework for data clustering (e.g., as described in articles by Coifman et al., Proceedings of the National Academy of Sciences, 102(21), 7432-7437, (2005); Lafon et al., IEEE Transactions on Pattern Analysis and Machine Intelligence, 28, 1393-1403 (2006); Nadler et al., Applied and Computational Harmonic Analysis 21, 113-127, (2006), the entirety of which is hereby incorporated by reference). Diffusion geometry is based on a discrete analog of the heat equation $$i\frac{\partial \Phi}{\partial t} = H\Phi, \quad (1)$$

where H is some operator with positive eigenvalues, guaranteeing that the temporal evolution of $\Phi(\vec{x}, t)$ is that of diffusion. Thus, starting out with $\Phi(\vec{x}, 0)$, e.g. a Gaussian concentrated around some data point one would expect $\Phi(\vec{x}, t)$ to spread over all space that is occupied by the data points. Although dynamic quantum clustering (DQC) and diffusion geometry are both based on models drawn from physics, the underlying physical intuition is quite different in the two cases. Diffusion geometry relies on a random-walk model (i.e., stochastic dynamics), which leads to a diffusion equation for a data point probability density function. In contrast, DQC relies on a quantum-mechanical time evolution (i.e., deterministic dynamics). This can provide deterministic trajectories of data points (e.g., from position expectations).

Data clustering according to the present approach has numerous applications. In biology and medicine, data clustering can provide systematics in plant and animal classifications; analysis of high-throughput experiments, such as DNA microarrays for patient and gene classifications; search for modules of genes in genetic or metabolic networks; and medical image analysis to differentiate types of tissue and blood. In market research and applications, data clustering can provide analysis of multivariate data to determine association of consumer populations and products; and creating relevant data presentations on search engine and/or web sites. Other applications include deciphering structures in mathematical chemistry; using similarity of geological data to evaluate reservoir properties, relating chemical and biological properties in different environments, and analysis of security information.

DETAILED DESCRIPTION

Introduction

Figure 1:
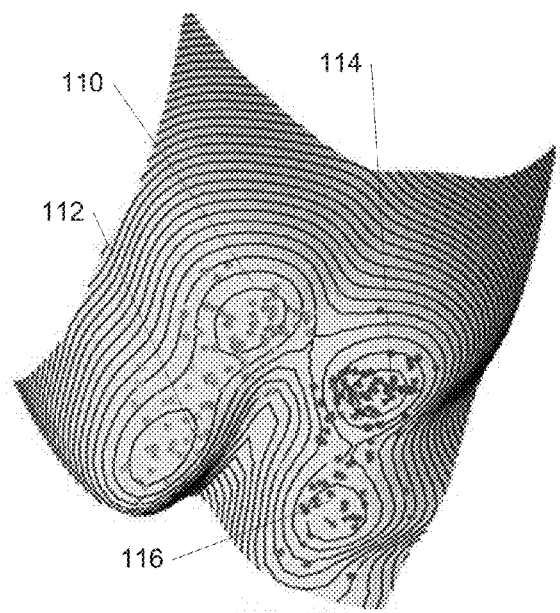
FIG. 1 is a plot of a quantum potential function relating to a quantum clustering example.

In this work we advocate the use of a Schrödinger Hamiltonian $\hat{H}$ that is intimately connected to the data-structure, as defined by the quantum clustering method summarized below. We extend it into a time-dependent Schrödinger equation:

$$i\frac{\partial \psi(\vec{x}, t)}{\partial t} = \hat{H}\psi(\vec{x}, t) \quad (2)$$

The ensuing Dynamic Quantum Clustering (DQC) formalism allows us, by varying a few parameters, to study in detail the temporal evolution of wave-functions representing the original data-points. In turn, this dynamical behavior allows us to explore the structure of the quantum potential function defined by the quantum clustering method.

DQC begins by associating each data-point with a state in Hilbert space. The temporal development of the centroids of these states may be viewed in the original data-space as moving images of the original points. Their distances to each other change with time, thus representing associations they form with each other. Convergence of many points onto a common center at some instant of time is a clear manifestation of clustering. Many transitional relationships may occur, revealing substructures in clusters or even more complex associations. For this reason, we propose this approach as a general method for visually and interactively searching for and exploring structures in sets of data.

Quantum Clustering

The quantum clustering approach begins, as does the well-known Parzen-window estimator, by associating to each of n data points $\vec{x}_i$ in a Euclidean space of d dimensions a Gaussian wave-function $$\psi_i(\vec{x}) = e^{-\frac{(\vec{x}-\vec{x}_i)^2}{2\sigma^2}}$$

and then constructing the sum of all these Gaussians, $$\psi(\vec{x}) = \sum_i e^{-\frac{(\vec{x}-\vec{x}_i)^2}{2\sigma^2}} \quad (3)$$

Conventional scale-space clustering views this function as a probability distribution (up to an overall factor) that could have generated the observed points, and regards therefore its maxima as determining locations of cluster centers. Often these maxima are not very prominent and, in order to uncover more of them, one has to reduce σ down to low values where the number and location of the maxima depend sensitively upon the choice of σ.

Quantum clustering took a different approach, requiring ψ to be the ground-state of the Hamiltonian $$\hat{H}\psi \equiv \left(-\frac{\sigma^2}{2}\nabla^2 + V(\vec{x})\right)\psi = E_0\psi \quad (4)$$

By positing this requirement, the potential function $V(\vec{x})$ has become inextricably bound to the system of data-points, since $V(\vec{x})$ is determined, up to a constant, by an algebraic inversion of Eq. 4. Moreover, one may expect V to have minima in regions where ψ has maxima and furthermore, that these minima will be more pronounced than the corresponding maxima found in the Parzen estimator. In fact, it frequently turns out that a concentration of data-points will lead to a local minimum in V, even if ψ does not display a local maximum. Thus, by replacing the problem of finding maxima of the Parzen estimator by the problem of locating the minima of the associated potential, $V(\vec{x})$, we simplify the process of identifying clusters. The effectiveness of quantum clustering has been demonstrated, e.g., as described in the above-cited article by Horn et al. It should be noted that the enhancement of features obtained by applying Eq. 4 comes from the interplay of two effects: attraction of the wave-function to the minima of V and spreading of the wave-function due to the second derivative (kinetic term). This may be viewed as an alternative model to the conventional probabilistic approach, incorporating attraction to cluster-centers and creation of noise, both inferred from—or realized by—the given experimental data.

DQC drops the probabilistic interpretation of ψ and replaces it by that of a probability-amplitude, as customary in Quantum Mechanics. DQC is set up to associate data-points with cluster centers in a natural fashion. Whereas in QC this association was done by finding their loci on the slopes of V, here we follow the quantum-mechanical temporal evolvement of states associated with these points.

Specifically, we will view each data-point as the expectation value of the position operator in a Gaussian wave-function $$\psi_i(\vec{x}) = e^{-\frac{(\vec{x}-\vec{x}_i)^2}{2\sigma^2}};$$

the temporal development of this state traces the association of the data-point it represents with the minima of $V(\vec{x})$ and thus, with the other data-points.

Dynamic Quantum Clustering (DQC)

As we already noted, the conversion of the static QC method to a full dynamical one, begins by focusing attention on the Gaussian wave-function, $$C\psi_i(\vec{x}) = e^{-\frac{(\vec{x}-\vec{x}_i)^2}{2\sigma^2}},$$

associated with the $i^{th}$ data point, where C is the appropriate normalization factor. Thus, by construction, the expectation value of the operator $\vec{x}$ in this state is simply the coordinates of the original data point; i.e., $$\vec{x}_i = \langle \psi_i | \vec{x} | \psi_i \rangle = \int d\vec{x}\, \psi_i^*(\vec{x})\vec{x}\psi_i(\vec{x}). \quad (5)$$

The dynamical part of the DQC algorithm is that, having constructed the potential function $V(\vec{x})$, we study the time evolution of each state $\psi_i(\vec{x})$ as determined by the time dependent Schrödinger equation; i.e., $$i\frac{\partial \psi(\vec{x},t)}{\partial t} = \hat{H}\psi_i(\vec{x},t) = \left(-\frac{\nabla^2}{2m} + V(\vec{x})\right)\psi_i(\vec{x},t) \quad (6)$$

where m is an arbitrarily chosen mass for a particle moving in d-dimensions. If we set $m=1/\sigma^2$ then, by construction, $\psi(\vec{x})$ of Eq. 3 is the lowest energy eigenstate of the Hamiltonian. If m is chosen to have a different value, then not only does each individual state $\psi(\vec{x})$ evolve in time, but so does the sum of the states, $\psi(\vec{x})$.

The important feature of quantum dynamics, which makes the evolution so useful in the clustering problem, is that according to Ehrenfest's theorem, the time-dependent expectation value $$\langle \psi_i(t)|\vec{x}|\psi_i(t)\rangle = \int d\vec{x}\, \psi_i^*(\vec{x},t)\vec{x}\psi_i(\vec{x},t) \quad (7)$$

satisfies the equation, $$\frac{d^2 \langle \vec{x}(t)\rangle}{dt^2} = -\frac{1}{m}\int d\vec{x}\, \psi_i^*(\vec{x},t)\vec{\nabla} V(\vec{x})\psi_i(\vec{x},t) \quad (8)$$

$$= \langle \psi_i(t)|\vec{\nabla} V(\vec{x})|\psi_i(t)\rangle \quad (9)$$

If $\psi_i(\vec{x})$ is a narrow Gaussian, this is equivalent to saying that the center of each wave-function rolls towards the nearest minimum of the potential according to the classical Newton's law of motion. This means we can explore the relation of this data point to the minima of $V(\vec{x})$ by following the time-dependent trajectory $$\langle \vec{x}_i(t)\rangle = \langle \psi_i(t)|\vec{x}|\psi_i(t)\rangle.$$

Clearly, given Ehrenfest's theorem, we expect to see any points located in, or near, the same local minimum of $V(\vec{x})$ to oscillate about that minimum, coming together and moving apart. In our numerical solutions, we generate animations that display this dynamics for a finite time. This allows us to visually trace the clustering of points associated with each one of the potential minima.

In the above-cited paper by Horn et al., classical gradient descent was successfully used to duster data by moving points (on classical trajectories) to the nearest local minimum of $V(\vec{x})$. The idea being that points which end up at the same minimum are in the same duster. At first glance, it would seem that DQC replaces the conceptually simple problem of implementing gradient descent with the more difficult one of solving complicated partial differential equations. We will show the difficulty is only apparent. In fact, the solution of the Schrödinger equation can be simplified considerably and allow further insights than the gradient descent method.

The DQC algorithm translates the problem of solving the Schrödinger equation into a matrix form which captures most of the details of the analytic problem, but which involves N×N matrices whose dimension, N, is less than or equal to the number of data points. This reduction is independent of the data-dimension of the original problem. From a computational point of view, there are many advantages to this approach. First, the formulas for constructing the mapping of the original problem to a matrix problem are all analytic and easy to evaluate, thus computing the relevant reduction is fast. Second, the evolution process only involves matrix multiplications, so many data points can be evolved simultaneously and, on a multi-core processor, in parallel. Third the time involved in producing the animations showing how the points move in data space scales linearly with the number of dimensions to be displayed. Finally, by introducing an m that is different from $1/\sigma^2$ we allow ourselves the freedom of employing low a, which introduces large numbers of minima into V, yet also having a low value for m that guarantees efficient tunneling, thus connecting points that may be located in nearby, nearly degenerate potential minima. By using this more general Hamiltonian, we reduce the sensitivity of the calculation to the specific choice of a.

One final point worth making before describing the method of calculation is that the use of Gaussian wave-functions to represent data points allows us to develop a number of flexible strategies for handling very large data sets. This issue will be addressed below.

The Calculation Method

Before discussing how this method works in practice we will give a brief outline of the details of the genera procedure. We begin by assuming that there are n data points that we wish to duster. To these data points we associate n states, $|\psi_i\rangle$. These states are n Gaussian wave-functions such that the $i^{th}$ Gaussian is centered on the coordinates of the $i^{th}$ data point. These states form a basis for the vector space within which we calculate the evolution of our model.

Let us denote by N, the n×n matrix formed from the scalar products $$N_{i,j} = \langle \psi_i | \psi_j \rangle \quad (10)$$

and by H, the n×n matrix $$H_{i,j} = \langle \psi_i | \hat{H} | \psi_j \rangle \quad (11)$$

and by $\vec{X}_{i,j}$ the matrix of expectation values $$\vec{X}_{i,j} = \langle \psi_i | \vec{x} | \psi_j \rangle \quad (12)$$

The calculation process can be described in five steps. First, begin by finding the eigenvectors of the symmetric matrix N which correspond to states having eigenvalues larger than some pre-assigned value; e.g., $10^{-5}$. These vectors are linear combinations of the original Gaussians that form an orthonormal set. Second, compute H in this orthonormal basis, $H^{tr}$. Do the same for $\vec{X}_{i,j}$. Fourth, find the eigenvectors and eigenvalues of $H^{tr}$, construct $|\psi_i(t)\rangle = e^{-itH^{tr}}|\psi\rangle$, that is the solution to the reduced time dependent Schrödinger problem $$i\frac{\partial}{\partial t}|\psi_i(t)\rangle = H^{tr}|\psi_i(t)\rangle \quad (13)$$

such that $|\psi_i(t=0)\rangle = |\psi_i\rangle$. Finally, construct the desired trajectories $$\langle \vec{x}_i(t) \rangle = \langle \psi_i | e^{itH^{tr}} \vec{X} e^{-itH^{tr}} | \psi_i \rangle \quad (14)$$

by evaluating this expression for a range of t and use them to create an animation. Stop the animation when clustering of points is apparent.

It is clear that restricting attention to the truncated Hamiltonian perforce loses some features of the original problem, however its advantage is that we can derive analytic expressions for all operators involved (see Appendices A and B). As a result, the numerical computations can be done very quickly. Experience has shown that as far as clustering is concerned this approximation causes no difficulties.

EXAMPLE

Ripley's Crab Data

To test our method we apply it to a five-dimensional dataset with two hundred entries, used in Ripley's text book (B. D. Ripley, "Pattern Recognition and Neural Networks", Cambridge University Press, Cambridge UK, 1996, hereby incorporated by reference in its entirety). This dataset records five measurements made on male and female crabs that belong to two different species. This dataset has been used in the original paper on quantum clustering by Horn et al. cited above. It is being used here to allow readers to compare the two techniques. Applications to other data sets will be discussed below. Our main motivation is to provide a simple example that exhibits the details of the DQC method. In particular, we wish to show that the simplest computational scheme for implementing the general program captures the essential features of the problem and does as well as one can reasonably expect to do.

The data is stored in a matrix M which has 200 rows and 5 columns. Following an often-used dimensional reduction method, we preprocess our data with a singular-value decomposition $$M = USV^\dagger \quad (15)$$

where U is a unitary 200×200 matrix and S is the 200×5 matrix of singular values, the latter occurring on the diagonal of its upper 5×5 entries. The sub-matrix of U consisting of the first five columns, the so-called five Principal Components (PCs), can be thought of as assigning to each sample a unique point in a five-dimensional vector space. We may study the problem in the full five-dimensional space or within any subspace by selecting appropriate principal components. In the above cited article by Horn et al., QC was applied to this problem in a 2-dimensional subspace, consisting of PC2 and PC3. In what follows, we will discuss the application of DQC to the 3-dimensional data composed of the first three PCs (although there would be no change in the results if we used all five dimensions).

In order to give the reader some feeling for how the quantum potential associated with the data looks in a simple case, we have included FIG. 1 where we exhibit the original data points with different colors of points correspond to known classes (green 110, orange 112, blue 114, red 116), placed upon the associated two-dimensional quantum potential, where the coordinates of the data points are chosen to be given by the second and third principal components. As is apparent from the plot the minima of the potential function do a very good job of capturing the different clusters. Moreover, letting data points roll downhill to the nearest minimum will produce a reasonable separation of the clusters.

Clearly, when we restrict attention to the first three PCs, the rows of the matrix obtained by restricting U to its first three columns are not guaranteed to be normalized to unity. Hence, we employ the conventional approach of projecting all points onto the unit sphere.

In what follows we study the temporal behavior of the curves $\langle \vec{x}_i(t) \rangle$, for all i. Henceforth we will refer to this as the "motion of points".

Figure 2A:
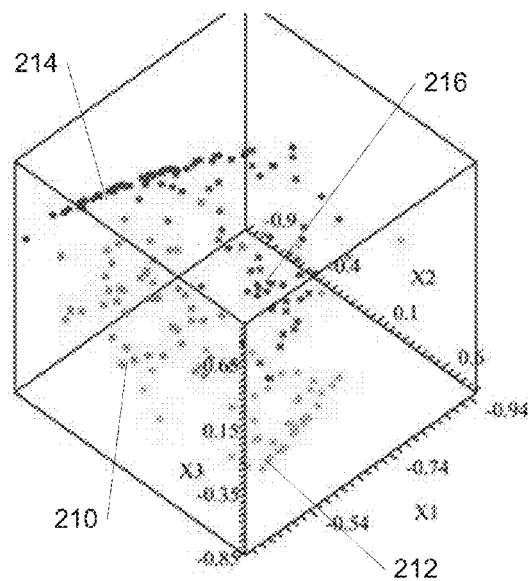
FIGS. 2a-c show initial (a), intermediate (b) and final (c) point positions relating to a dynamic quantum clustering example.

FIG. 2a shows the distribution of the original data points plotted on the unit sphere in three dimensions. This is the configuration before we begin the dynamic quantum evolution. To visually display the quality of the separation we have colored the data according to its known four classes, however this information is not incorporated into our unsupervised method. To begin with, we see that the two species of crabs ((red 216, blue 214) and (orange 212, green 210)) are fairly well separated; however, separating the sexes in each species is problematic.

Figure 2B:
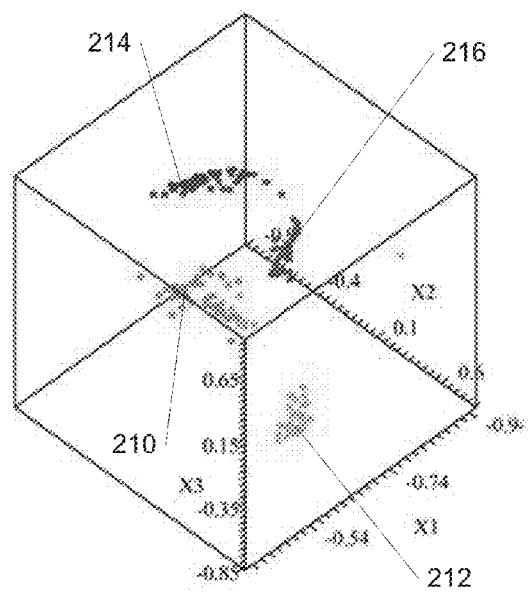

FIG. 2b shows the distribution of the points after a single stage of quantum evolution, stopped at a time when points first cross one another and some convergence into clusters has occurred. It is immediately apparent that the quantum evolution has enhanced the clustering and made it trivial to separate clusters by eye. Once separation is accomplished, extracting the clusters can be performed by eye from the plots or by any conventional technique, e.g. k-means.

Figure 2C:
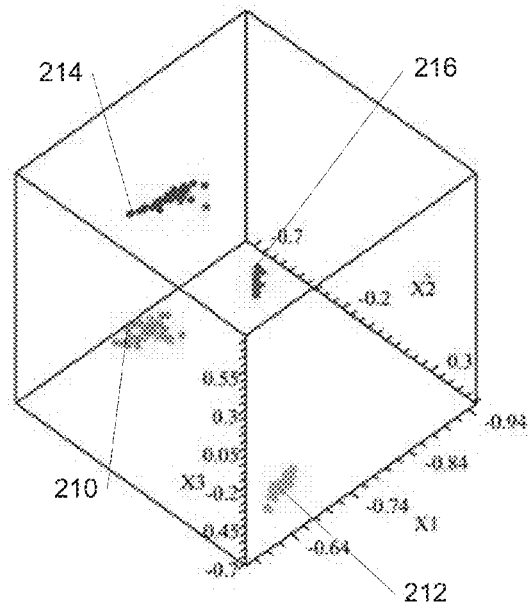

FIG. 2c shows the results of an additional iteration of DQC. In this example, the values of parameters used to construct the Hamiltonian and evolution operator are σ=0.07 and m=0.2. Colors indicate the expert classification of data into four classes, unknown to the clustering algorithm. Note, small modifications of the parameters lead to the same results.

Figure 3A:
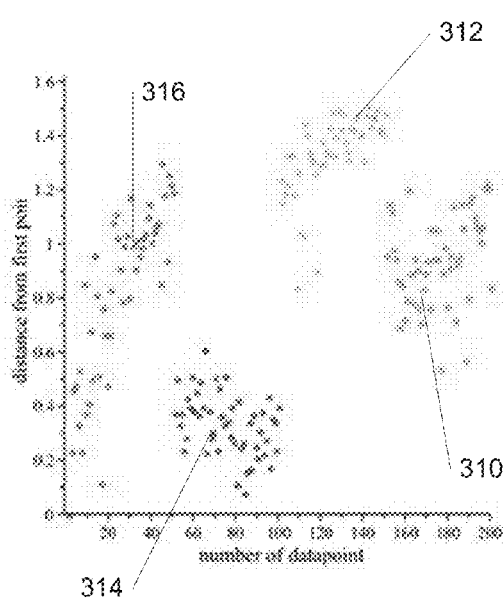
FIGS. 3a-c show initial (a), intermediate (b) and final (c) point separations from the first point relating to a dynamic quantum clustering example.
Figure 3B:
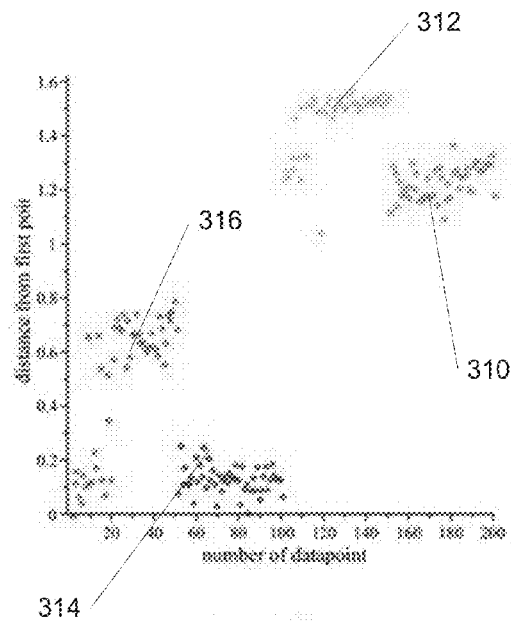
Figure 3C:
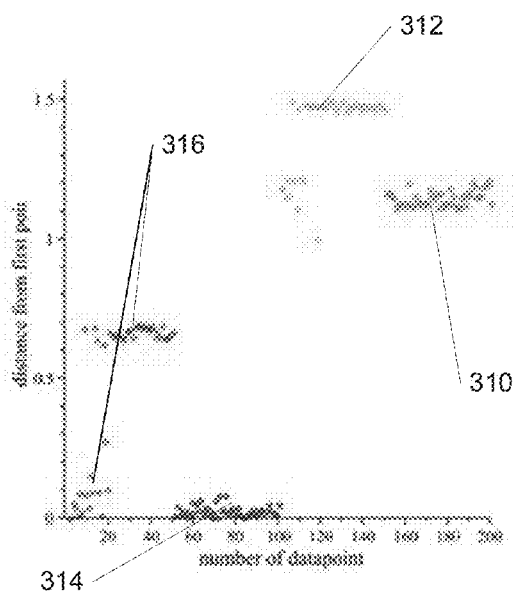

An alternative way of displaying convergence is shown in FIGS. 3a-c, where we plot the Euclidean distance from the first point in the dataset to each of the other points. FIG. 3a shows the distances for the initial distribution of points. FIG. 3b shows the same distances after quantum evolution. FIG. 3c shows results after another iteration of DQC. The numbering of the data-points is ordered according to the expert classification of these points into four classes (red 316, blue 314, orange 312, green 310) containing 50 instances each.

The clusters lie in bands that have approximately the same distance from the first point. It is difficult to get very tight clusters since the points, while moving toward cluster centers, oscillate around them, and arrive at the minima at slightly different times. Given this intuition, it is clear that one way to tighten up the pattern is to stop DQC evolution at a point where the clusters become distinct, and then restart it with the new configuration, but with the points redefined at rest. We refer to this as iterating the DQC evolution. When iterating the DQC evolution, a new potential V is computed based on the current point positions, then DQC evolution is performed in the new potential. FIGS. 2c and 3c show what happens when we do this. The second stage of evolution clearly tightens up the clusters significantly, as was expected.

By the end of the second iteration, there can be no question that it is a simple matter to extract the clusters. As is quite evident, clustering does not agree completely with the expert classification, i.e. points with different colors may be grouped together. This is, however, the best one can do by color-blind treatment of the information provided in the data-matrix. As we already noted, the full 5-dimensional study of the crab data-set can proceed in the same manner, although it does not lead to new insights.

Dynamic Distances

The fact that data-points of different classes happen to lie close to each other in the data-matrix can be due to various factors: errors in data measurements, errors in the expert assignment to classes, true proximity of data-points in spite of differences of origin (extreme example would be similarities of phenotypes in spite of differences in genotypes) or—the simplest possibility—the absence of some discriminative features in the feature-space that spans the data measurements. However, there is another important conceptual message to be learned here—clustering and/or classification may not capture all the interesting lessons that may be derived from the data. A similar message is included in the above-described Diffusion Geometry approach that advocates measuring diffusion-distances among points rather than Euclidean ones. Diffusion distances are influenced by the existence of all other points. In our DQC analysis this may be replaced in a straightforward manner by defining dynamic distances among points $$d_{i,j}(t) = \|\langle \vec{x}_i(t) | - | \vec{x}_j(t) \rangle\| \quad (16)$$

with the norm being Euclidean or any other suitable choice.

Clearly $d_{i,j}(0)$ is the geometric distance as given by the original data-matrix or by its reduced form that is being investigated. As DQC evolves with time $d_{i,j}(t)$ changes, and when some semi-perfect clustering is obtained, it will be close to zero for points that belong to the same cluster. FIGS. 3a-c show this change in time for all $d_{i,1}(t)$ in the crab-data example studied above. It is apparent that, in addition to the few cases in which clustering disagrees with classification, there are many intermediate steps where different data-points are close to each other in spite of eventually evolving into different clusters and belonging to different classes. Thus a close scrutiny of the dynamic distances matrix $d_{i,j}(t)$ may lead to interesting observations regarding the relationships among individual pairs of points in the original data, a relationship that is brought out by DQC as result of the existing information about all other data-points. It may be used to further investigate the reason for such proximities, along any one of the lines mentioned above, and thus may lead to novel insights regarding the problem at hand.

Analysis of Large Data Sets

There are many scientific and commercial fields, such as cosmology, epidemiology, and risk-management, where the data sets of interest contain many points, often also in large numbers of dimensions. We have already discussed how to overcome the problem of large dimensions. Dealing with large number of points requires yet a new angle. In problems of this sort it is clear from the outset that, especially on a personal computer (PC), diagonalizing matrices which are larger than 2000×2000 is computationally intensive. It is clear that using brute force methods to evolve sets of data having tens of thousands of points simply will not work. The solution to the problem of dealing with sets of data containing tens of thousands of entries each with N features, lies in the fact that the Singular Value Decomposition (SVD) decomposition maps the data into an N-dimensional cube, and the fact that the data points are represented by states in Hilbert space rather than N-tuples of real numbers. Since there is a literature on ways to do SVD decomposition for large sets of data, we will not address this point here. What we do wish to discuss is how to exploit the representation of data points as states in Hilbert space in order to evolve large sets of data.

The trick is to observe that since Gaussian wave-functions whose centers lie within a given cube have non-vanishing overlaps, as one chooses more and more wave-functions one eventually arrives at a situation where the states become what we will refer to as essentially linearly dependent. In other words, we arrive at a stage at which any new wave-function added to the set can, to some predetermined accuracy, be expressed as a linear combination of the wave-functions we already have. Of course, since quantum mechanical time evolution is a linear process, this means that this additional state (which can be regarded as an auxiliary state) can be evolved by expressing it as a linear combination of the previously selected states and evolving them. Since computing the overlap of two Gaussians is done analytically (Appendix B) determining which points determine the set of maximally essentially linearly independent states for the problem is easy. Typically, even for data sets with 35,000 points, this is of the order of 1000 points. This works because, as we have already noted, we do not need high accuracy for DQC evolution. The quality of the clustering degrades very slowly with loss in accuracy. Thus, we can compute the time evolution operator in terms of a well-chosen subset of the data and then apply it to the whole set of points. This is particularly attractive for new multi-core PCs and for computer clusters, since it is possible, even in high-level languages, to write multi-threaded programs that farm the multiplication of large numbers of vectors out to different processors. This means that one can achieve a great improvement in the speed of the computation for very little additional work.

To demonstrate this versatility of DQC we have analyzed a set of 35,213 points in 20 dimensions. We are grateful to JoAnne Hewett and Tom Rizzo for providing us with this example. The points in the plot represent sample supersymmetric models for physics beyond the Standard Model that satisfy all experimental constraints in a parameter space of twenty dimensions. This data-set definitely shows some non-trivial variations in density that can be made apparent by a visual inspection of the data plotted in different dimensional combinations. However, DQC is needed to obtain good visual deciphering of the different structures. Selecting a subset of 1200 points, whose Gaussians we consider to be a set of essentially linearly independent states for the problem, we construct $H^{tr}$. By expanding the remaining states in terms of these 1200 states we can easily evaluate the DQC evolution of all 35,213 points. The results are displayed in FIGS. 4a-d.

Figure 4A:
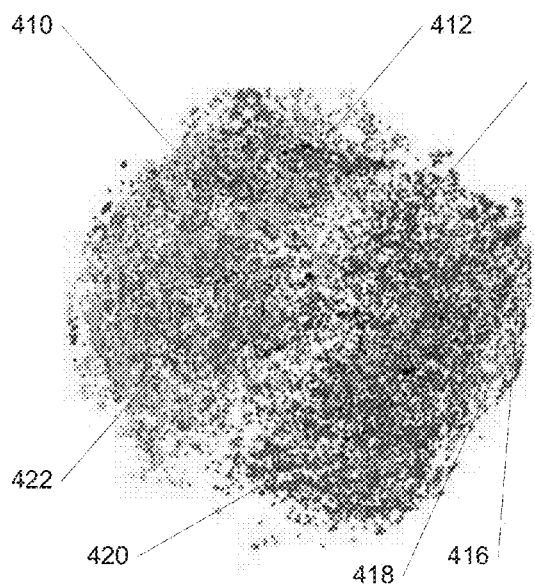
FIGS. 4a-d show initial (a), intermediate (b and c) and final (d) point positions relating to a dynamic quantum clustering example of a large and high-dimensional data set.
Figure 4B:
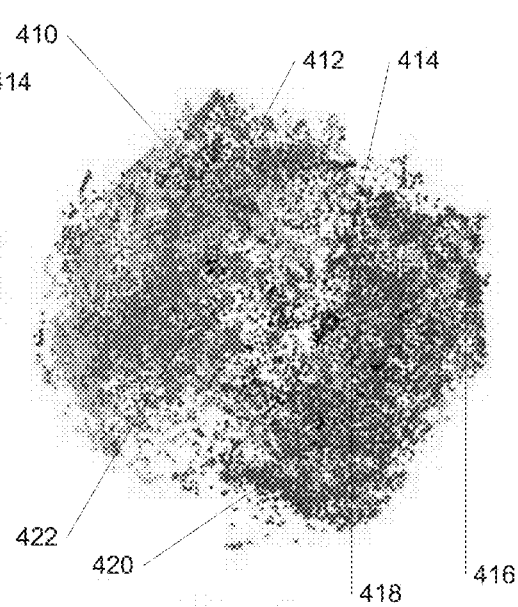
Figure 4C:
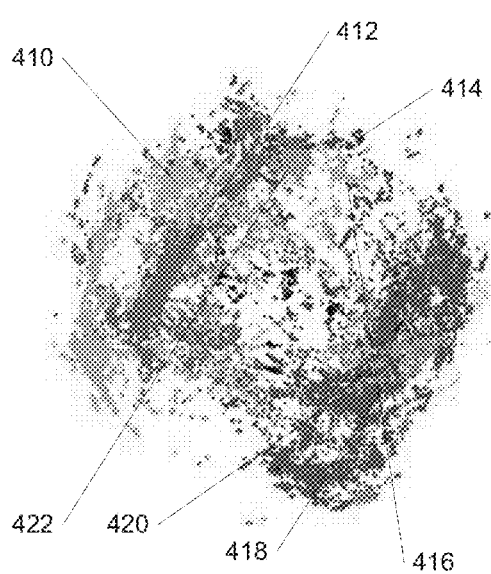
Figure 4D:
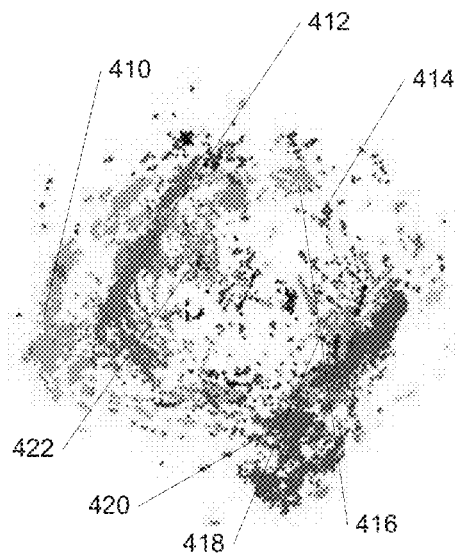

More specifically, FIGS. 4a-d are plots of the first three principal components for this large data-set, before and after DQC evolution. Three stages of DQC development are shown. Thus, FIG. 4a is the initial configuration, FIG. 4b is after one iteration of DQC, FIG. 4c is after 2 iterations of DQC, and FIG. 4d is after 3 iterations of DQC. The coloring was decided upon by selecting the most apparent clusters from the evolved data and assigning colors to them—light blue 410, pink 412, orange 416, green 418, red 420, and gray 422. The dark blue points 414 correspond to points that were not assigned to clusters. The purpose of coloring is to be able to look at the points in the original data, discern those that belong to common structures, and follow their dynamic distances under DQC evolution.

It seems very clear how the structures develop with DQC. Using the last DQC stage, it is possible to identify the main structures and assign each substructure a different color. One can then examine the colored version of a plot of the individual data points, discern the structures that belong together, and follow the DQC development tracing out dynamic distances between the different points and structures in all dimensions.

Interplay of Feature Selection with DQC

Data exploration involves not only the instances, or data-points, but also the features (coordinates) with which the instances are defined. By performing SVD, and selecting a subset of coordinates, we define superpositions of the original features within which we search for clustering of the instances. In problems with very many features, it is advantageous to also perform some feature filtering, employing a judicious selection of subsets of the original features. Clearly, the effectiveness of preprocessing data using some method for selecting important features is well appreciated. What we wish to show in this discussion is how easily one distinguishes the effects of feature filtering in our visual approach and how easy it is, in problems where one has an expert classification, to see if the unsupervised method used to select important features is working well. Furthermore, we wish to show the power of combining iterations of an SVD based feature filtering algorithm in conjunction with iterations of DQC. To do this we will show what happens when one applies these ideas to the dataset of Golub et al. (Molecular Classification of Cancer: Class Discovery and Class Prediction by Gene Expression Monitoring. Science 286 531 (1999), hereby incorporated by reference in its entirety).

The Golub et al. dataset contains gene chip measurements on cells from 72 leukemia patients with two different types of Leukemia, ALL and AML. The expert identification of the classes in this data set is based upon dividing the ALL set into two subsets corresponding to T-cell and B-cell Leukemia. The AML set is divided into patients who underwent treatment and those who did not. In total, the apparatus used in this experiment measured the expression of 7129 genes. The feature filtering method we employ is based on SVD-entropy, and is a simple modification of a method introduced by Varshaysky et al. (Novel Unsupervised Feature Filtering of Biological Data, Bioinformatics 22 no, 14 (2006), e507-e513, hereby incorporated by reference in its entirety) and applied to the same data.

The method begins by computing the SVD-based entropy of a dataset M (matrix of n instances by m features of Eq. 15) based on the eigenvalues $s_j$ of its diagonal matrix S. Defining normalized relative variance values $$v_j = \frac{s_j^2}{\sum_k s_k^2},$$

the dataset entropy is defined through $$E = -\frac{1}{\log r} \sum_{j=1}^{r} v_j \log(v_j) \tag{17}$$

where r is the rank of the data-matrix, typically much smaller than m. Given the dataset entropy of the matrix M, define the contribution of the $i^{th}$ feature to the entropy using a leave-one-out comparison; i.e., for each feature we construct the quantity $$CE_i = E(M_{(n \times m)}) - E(M_{(n \times (m-1))}) \tag{18}$$

where the second entropy is computed for the matrix with the $i^{th}$ feature removed. Our filtering technique will be to remove all features for which $CE_i \leq 0$.

Figure 5A:
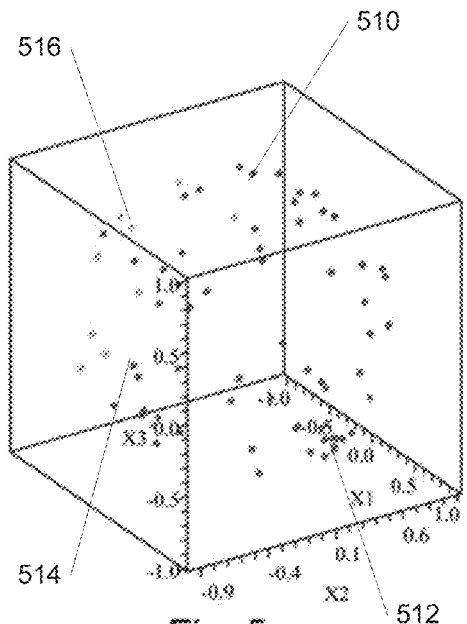
FIGS. 5a-b show initial (a) and final (b) point positions relating to a dynamic quantum clustering example.
Figure 5B:
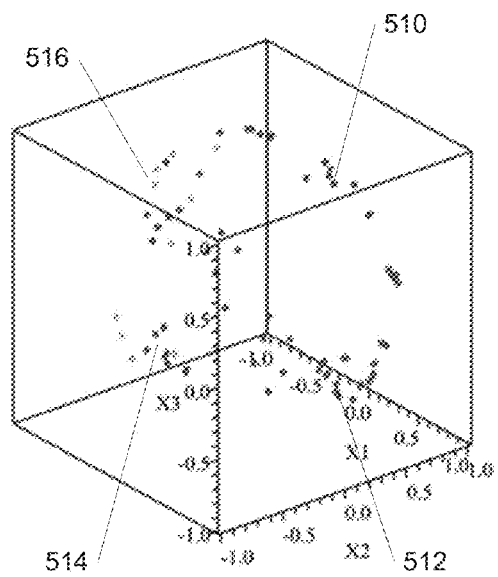

FIG. 5a displays the raw data for this example in the 3-dimensional space defined by PCs 2 to 4. FIG. 5b displays the effect that DQC has on these data, using σ=0.2 and a mass m=0.01. The different classes are shown as blue 510, red 512, green 514 and orange 516. Clearly, without the coloring it would be hard to identify clusters.

Figure 6A:
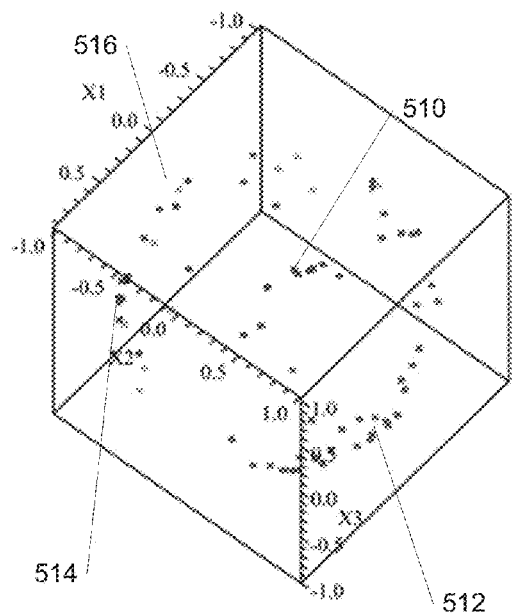
FIGS. 6a-b show initial (a) and final (b) point positions relating to a dynamic quantum clustering example.
Figure 6B:
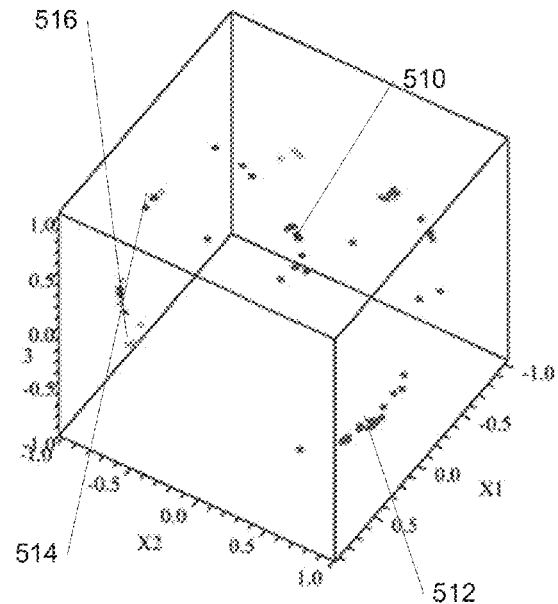
Figure 7A:
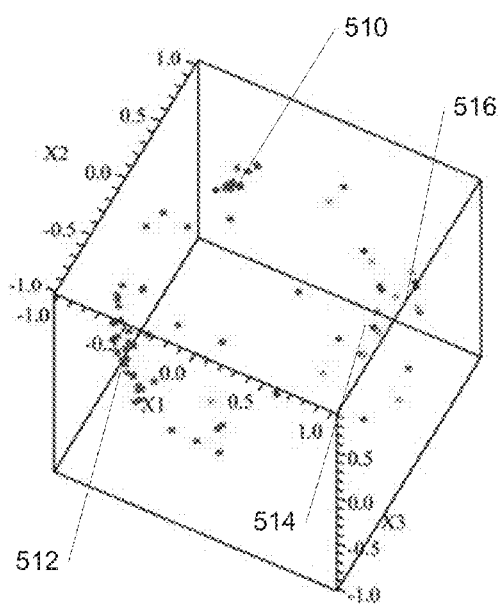
FIGS. 7a-b show initial (a) and final (b) point positions relating to a dynamic quantum clustering example.
Figure 7B:
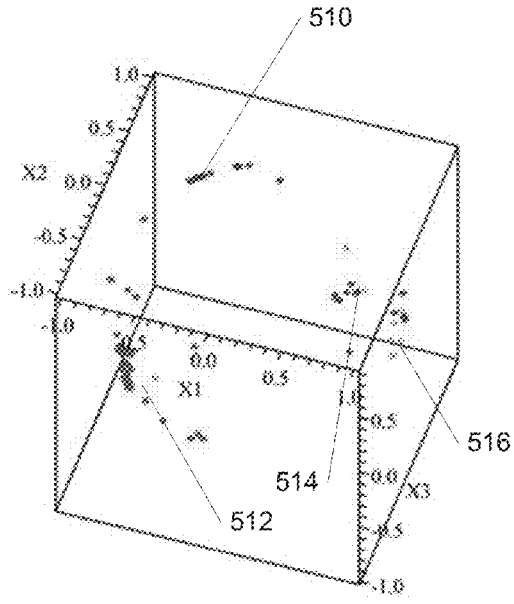

In FIGS. 6a-b we see the result of applying feature filtering to the original data, represented in the same 3 dimensions, followed by DQC evolution. FIG. 6a is the Golub data after one stage of SVD-entropy based filtering, but before DQC evolution. FIG. 6b is the same data after DQC evolution. Applying a single stage of filtering has a dramatic effect upon clustering, even before DQC evolution. The latter helps sharpening the cluster separation, FIGS. 7a-b show the results of three iterations of SVD-entropy, before and after DQC evolution. FIG. 7a is the data after three stages of SVD-entropy based filtering, but before DQC evolution. FIG. 7b is the same data after DQC evolution. These plots, especially the after DQC pictures, show dramatic clustering, especially for the blue points 510. With each stage of filtering, we see that the blue points 510 cluster better and better, in that the single red outlier 512 separates from the cluster and the cluster separates more and more from the other points. The blue points 510 are what we will refer to as a clearly robust cluster that has been identified in early stages of filtering. If one continues iterating past the fifth stage, however, the clear separation of the blue points 512 from the others (512, 514, 516) begins to diminish. Thus, we see that the SVD-entropy based filtering, in trying to enhance the clumping of the red points, starts throwing away those features that make the blue cluster distinct. Since this effect is quite pronounced we would say that features that are important to distinguishing the blue cluster from the others begin to be removed at the sixth and higher iterations of filtering. This is, of course, just what we are looking for, a way of identifying those features that are important to the existing biological clustering. Out of the original 7129 features, we have reduced ourselves to 2766 features by the fifth iteration. In going from step five to step six this gets further reduced to 2488 features, so we could begin searching among the 278 eliminated features to isolate those most responsible for the separation of the blue cluster from the others. Instead, we will take another track and, since it is so robust and easily identified, remove the blue cluster from the original data and repeat the same process without this cluster. The idea here is that now the SVD-entropy based filtering will not be pulled by the blue cluster and so it will do a better job of sorting out the red, green, and orange clusters. As we will see, this is in fact the case.

Figure 8A:
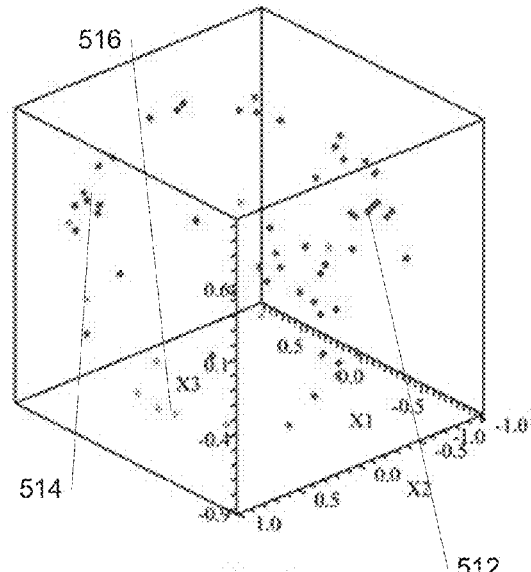
FIGS. 8a-b show intermediate (a) and final (b) point positions relating to a SVD-entropy clustering example.
Figure 8B:
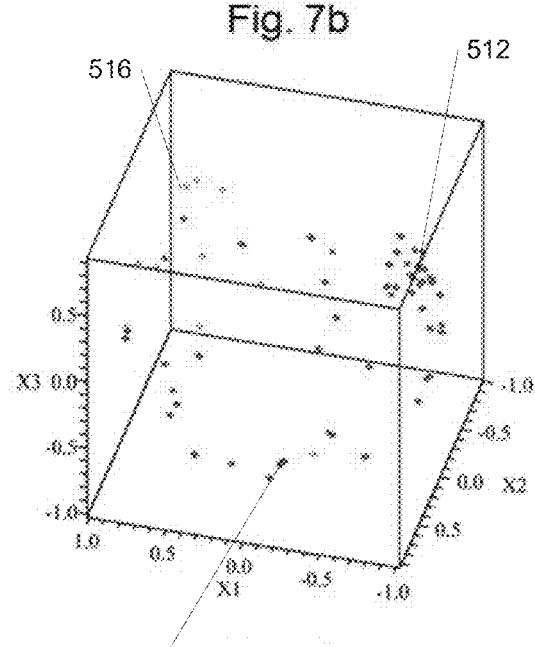

In FIGS. 8a-b we see plots of what the starting configurations look like if one takes the original data, removes the identified blue cluster 510 and re-sorts the reduced data set according to the SVD-entropy based filtering rules. FIG. 8a is what happens if one filters a single time, removing those features, i, whose one-left-out comparison, $CE_i$, is less than or equal to zero. FIG. 8b shows what happens if one repeats this procedure two more times, each time removing features for which $CE_i \leq 0$. There is no problem seeing that each iteration of the SVD-entropy based filtering step improves the separation of the starting clusters. By the time we have done five SVD-entropy based filtering steps the red 512, green 514, and orange 516 clusters are distinct, if not clearly separated.

Figures 9A, 9B:
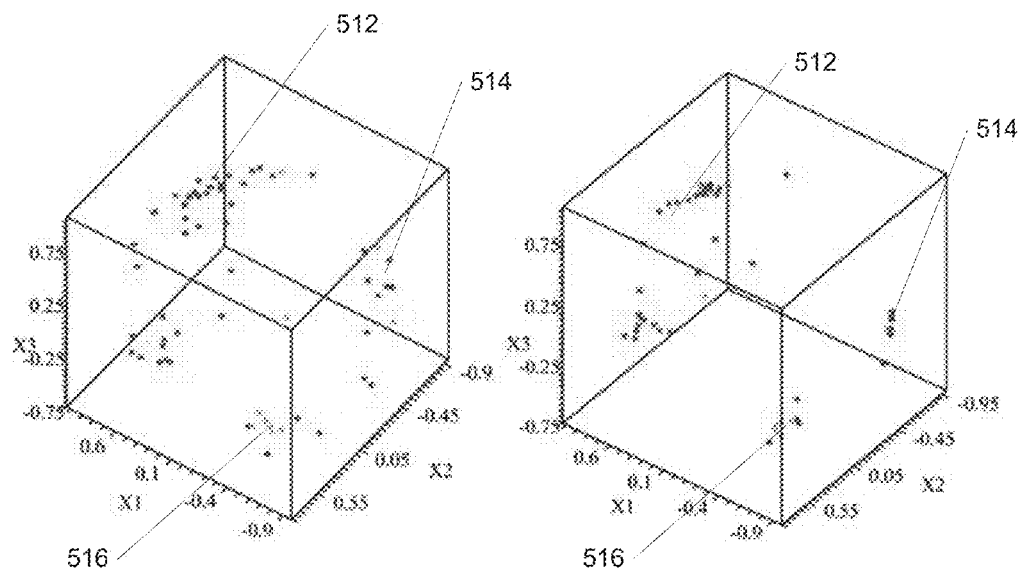
FIGS. 9a-c show initial (a), intermediate (b) and final (c) point positions relating to a combined DQC and SVD-entropy example.
Figure 9C:
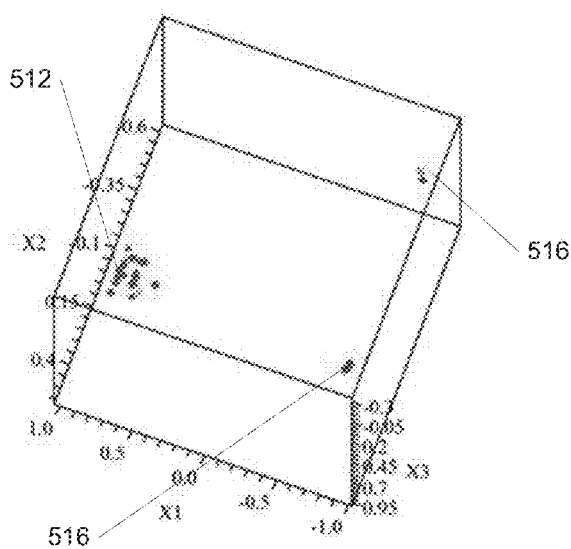

Finally, to complete our discussion, we show FIGS. 9a-c. These figures show the results of doing five iterations of the SVD-entropy based filtering and following that with three stages of DQC evolution. FIG. 9a is what the starting data looks like if one first removes the blue points and does five stages of SVD-entropy based filtering. FIG. 9b is what happens after one stage of DQC evolution. FIG. 9c is the final result after iterating the DQC evolution step two more times. At this point, the clusters are trivially extracted.

The dramatic clustering accomplished by DQC evolution makes it easy to extract clusters. Note however, that in FIG. 9b we see what we have seen throughout, that the red points 512 first form two distinct sub-clusters that only merge after two more stages of DQC evolution. This constant repetition of the same phenomenon, which is only made more apparent by SVD-entropy based filtering, is certainly a real feature of the data. It presumably says that what appears to be a sample of a single type of cell at the biological level is in reality two somewhat different types of cells when one looks at gene expression. A measure of the success of clustering is given by the Jaccard score which, for this result is 0.762, and is higher than the value 0.707 obtained by Varshaysky et al. in the above-cited article. The Jaccard score is evaluated by considering all pairs of data points, and asking if they cluster together and if they fit in the same class, as judged by the expert. The Jaccard score is then defined by $$J = \frac{tp}{tp + fp + fn},$$

where tp, fp, and fn, stand for true-positive, false-positive and false-negative, correspondingly.

CONCLUSION AND OUTLOOK

We have proposed a dynamical method for exploring proximity relationships among data-points in large spaces. Starting with the potential function of quantum clustering we have shown how to embed it into a dynamical theory so as to provide a visual exploratory tool. Formulating the theoretical treatment using coherent (Gaussian) states allows us to derive analytic expressions for all necessary calculations of the temporal evolution. This allows us to treat quite complicated data and put them into a visual framework that can be easily manipulated by the user who wishes to search for structures in the data. We have tested the system on random data to make sure that it does not produce unwarranted clustering structures.

Throughout this text, we represent the DQC evolution of the Gaussians associated with the original data-points, by following the centers of the evolving wave-functions. It should be noted that there is more information to be gained from the full wave-function of a data-point: it is expected to expand, at times, and cover a large fraction of the domain of the cluster with which this point is associated. It may also tunnel into neighboring clusters with which the point has small dynamic distances. We expect this notion to be particularly useful when the data may be better described in terms of 'elongated clusters', i.e. when cluster cores are not points but lines (e.g. a ring) or higher-dimensional manifolds. Note that our methodology is not confined to potentials that have only well-separated minima.

We have discussed the virtues of combining DQC with some preprocessing tools. The first was SVD, which was used to limit the range of the data values and to allow us to do some dimensional reduction. While dimensional reduction is a must for handling data in very large dimensions, and it helps to remove noise from the data, we wish to point out that DQC can handle a large number of features without much difficulty. The computational complexity of the problem is controlled by the number of data-points, since this defines the size of the matrix to be exponentiated. The computational cost associated with keeping more features is only related to computing the matrices associated with multiplying a wave-function by a given coordinate. This is a one-time cost. The computational cost of computing the values of these operators only grows linearly with the number of features. Clearly it is possible to avoid these costs by keeping a large number of features when constructing the quantum potential, $V(\vec{x})$, and plotting a much smaller number of features when constructing the animations. Experience has shown that after one stage of DQC evolution, clustering which occurs because of structures in $V(\vec{x})$ that are only seen in features that are not plotted in the animations becomes readily visible in those plots that we do construct. This aspect of DQC allows us to avoid some of the problems associated with using SVD to strongly reduce the number of dimensions. In addition to dimensional reduction based upon simply making an SVD decomposition of the data, we discussed one scheme for selecting individual features that are judged to be relevant to the data at hand. Since our problem is unsupervised, we employed a feature filtering method that depends on the contribution of the features to SVD-entropy. The examples showed that the visual nature of DQC made it easy to judge the effectiveness of feature filtering, especially after iterative applications of DQC evolution.

We have already noted, that for sets of data containing entries with a very large number of features, DQC has the computational advantage that once one has formed the Hamiltonian of the system, the computational problem is carried out using a matrix which has no more rows and columns than the number of data points. Moreover, we have seen that the simplest reduction of the analytic problem of assigning data points to minima of the multi-dimensional potential function works remarkably well. Going beyond the truncation procedure explained in Appendix B, while easily doable, seems unnecessary for most problems, and this allows us to greatly speed up the computations. In our analysis, we went on to discuss the case of data sets containing large numbers of points. It turns out that, using our Hilbert space representation of data-points, we can naturally select a small set of points whose Gaussians span efficiently the entire Hilbert space. These Gaussians are then used as the basis for calculating the DQC evolvement of all points. It is apparent from the example displayed in FIGS.

4a-d how well these properties of DQC can be employed to discern structures in the large data-set under consideration.

Finally, we wish to observe that our DQC methods can be easily extended to general classification problems that are usually resolved by supervised machine learning methods. The point is that given a training set, i.e., a data set that has been fully resolved by DQC once the appropriate stages of dimensional reduction and feature filtering has been applied, then one can use this set to classify new data. There are two different ways one can accomplish this task. In the first approach we use the fact that the training set has been successfully clustered to assign distinct colors to points that lie in the training set, so that they may be visually identify in all subsequent studies. Once this has been done, the classification of new data points can be accomplished in two steps. First, reduce the SVD matrix containing both the training set and the new data points (using the previously determined features) to an appropriate dimension, and construct the QC potential for the full data set including the training set. Next, apply DQC In study the evolution of the full system using the new QC potential and see how the new points associate themselves with the points in the training set. Note, as always, both the intermediate dynamics and eventual coalescence of the full set into clusters can give useful information about the full data set. The fact that the old points have been colored according to the original classification scheme makes it possible to see if the SVD reduction of the full data set (training set plus new data) distorts the original classification. If this happens, i.e. if the original points fail to cluster properly, then one can go back and use the tools of feature filtering, etc. to analyze what has changed. This sort of visual identification of aspects of the data that distort clustering was already used in the case of the leukemia data set to see that the existence of a strong cluster can distort the clustering of the remaining data. Once this easily identified cluster was removed from the data set the clustering of the remaining data was significantly improved.

The second approach, which is necessary if the dataset contains many entries and the training set is itself large, is to use only the training set to generate the quantum potential and the exponential of the Hamiltonian. Next, as we already discussed, use this operator to evolve the full dataset, including the training set. In this case, the training set is guaranteed to cluster as before and we can categorize the new points according to how they associate with known clusters in the training data.

The preceding description has been by way of example as opposed to limitation, and many variations of the given examples can also be employed in practicing embodiments of the invention. For example, the quantum-mechanical Schrödinger formalism (i.e., time-dependent states, time-independent operators) has been employed to calculate expected positions. The above development can also be equivalently expressed in the Heisenberg formalism (time-dependent operators, time-independent states), since it is well known in the art that calculated results (i.e., expected positions) do not depend on which of these formalisms is employed.

As another example, it is possible to generalize the quantum mechanical time evolution by including a small diffusion component, so that time evolution is governed by $$\frac{i}{1-i\varepsilon}\frac{\partial \psi_i(\vec{x}, t)}{\partial t} = \hat{H}\psi_i(\vec{x}, t), \quad (19)$$

where e is the diffusion parameter. In this approach, it is necessary to modify the expectation calculations to properly account for non-unitary time evolution.

APPENDIX A

Useful Operator Identities

Using conventional quantum-mechanical notation we represent the Gaussian wave-function by $$|\sigma\rangle = (\sqrt{\pi}\sigma)^{-\frac{1}{2}} e^{-x^2/2\sigma^2} \quad (20)$$

where we adopted Dirac's bra and ket notation to denote
$|\psi\rangle = \psi(x)$ and $\langle\psi| = \psi(x)^*$.

Employing the operators x and $$p = \frac{1}{i}\frac{d}{dx}$$

obeying the commutation relations [x, p]=i, we define the annihilation operator $$A_\sigma = i\frac{\sigma}{\sqrt{2}}p + \frac{1}{\sigma\sqrt{2}}x \quad (21)$$

obeying
$A_\sigma|\sigma\rangle = 0.$ its Hermitian adjoint creation operator can be $$A_\sigma^\dagger = -i\frac{\sigma}{\sqrt{2}}p + \frac{1}{\sigma\sqrt{2}}x \text{ obeys } [A_\sigma, A_\sigma^\dagger] = 1.$$

We will need a few identities to derive the matrix elements we have to calculate. First we note the normal ordering identity (meaning rewriting by using the operator commutation relations so that $A_\sigma$'s appear to the right of all $A_\sigma^\dagger$'s):

$$e^{\alpha(A_\sigma^\dagger + A_\sigma)} = e^{\alpha^2/2}e^{\alpha A_\sigma^\dagger}e^{\alpha A_\sigma} \quad (22)$$

which may be proven by differentiation with respect to α. Next we note that $$e^{g(\alpha)A_\sigma^\dagger}A_\sigma e^{-g(\alpha)A_\sigma^\dagger} = \quad (23)$$

$$\sum_n \frac{g(\alpha)^n}{n!}[A_\sigma^\dagger, [A_\sigma^\dagger, [\cdots, [A_\sigma^\dagger, A_\sigma]]]\cdots]_n = A_\sigma - g(\alpha)$$

which is easily derived by differentiating with respect to g and noting that only the first commutator is non-zero. A similar calculation proves the equally useful result:

$$e^{\alpha(A_\sigma^\dagger - A_\sigma)} = e^{\alpha^2/2}e^{\alpha A_\sigma^\dagger}e^{-\alpha A_\sigma} \quad (22)$$

Now, because the Parzen window estimator is constructed using Gaussian wave-functions centered about points other than x=0, it is convenient to have an operator expression which relates the Gaussian centered about x=0 to the Gaussian centered about $x=\vec{x}$.

Theorem:

$$|\sigma, \vec{x}\rangle = e^{-ip\vec{x}}|\sigma\rangle$$

is a normalized Gaussian wave-function centered at $x = \vec{x}$; i.e.

$$|\sigma, \vec{x}\rangle = (\sqrt{\pi}\,\sigma)^{-\frac{1}{2}} e^{-(x-\vec{x})^2/2\sigma^2} \quad (25)$$

This state is known as a coherent state, obeying $$A_\sigma |\sigma, \vec{x}\rangle = \vec{x}\,|\sigma, \vec{x}\rangle \quad (26)$$

The generalization to Gaussians in any number of dimensions is straightforward, since they are just products of Gaussians defined in each one of the different dimensions.

APPENDIX B

Matrix Elements

The states we start out with $|\sigma, \vec{x}_i\rangle$ norm one and are, in general, linearly independent; however, they are not orthogonal to one another. In what follows we will need an explicit formula for the scalar product of any such Gaussian with another $|\sigma, \vec{x}_i\rangle$. This is easily derived given the operator form for the shifted Gaussian derived in Appendix A. Thus we find that $$\langle \sigma, \vec{y} | \sigma, \vec{x} \rangle = \langle \sigma | e^{-ip(\vec{x}-\vec{y})}|\sigma\rangle = e^{-(\vec{x}-\vec{y})^2/4\sigma^2} \quad (27)$$

which is needed for computing the matrix of scalar products $$N_{i,j} = \langle \sigma, \vec{x}_i | \sigma, \vec{x}_j \rangle.$$

Similarly, by employing $$e^{ip\vec{y}} x e^{-ip\vec{y}} = x + \vec{y}$$

we find that $$\langle \sigma, \vec{y} | x | \sigma, \vec{x} \rangle = \frac{(\vec{x}+\vec{y})}{2} e^{-(\vec{x}-\vec{y})^2/4\sigma^2} \quad (28)$$

It is straightforward to generalize this derivation to obtain $$\langle \sigma, \vec{y} | V(x) | \sigma, \vec{x} \rangle = e^{-(\vec{x}-\vec{y})^2/4\sigma^2} \left\langle \sigma \left| V\left(x + \frac{\vec{x}+\vec{y}}{2}\right) \right| \sigma \right\rangle \quad (29)$$

for any function $V(x)$. Note that this expectation value can be evaluated by expanding $V$ in a Taylor series about the point $(\vec{x}+\vec{y})/2$. The leading term is simply $$e^{-(\vec{x}-\vec{y})^2/4\sigma^2} V\left(\frac{\vec{x}+\vec{y}}{2}\right)$$

and the remaining terms, involving $\langle \sigma | x^n | \sigma \rangle$ can be evaluated from the identity $$\langle \sigma | e^{\alpha x} | \sigma \rangle = \sum_{n=0}^{\infty} \frac{\alpha^n}{n!} \langle \sigma | x^n | \sigma \rangle = \sum_{p=0}^{\infty} \frac{\alpha^{2p}}{4^p} \frac{\sigma^{2p}}{p!} \quad (30)$$

To speed up computations we chose to approximate all expectation values of $V(x)$ by $$V\left(\frac{\vec{x}+\vec{y}}{2}\right),$$

the first term in this series. A more accurate approximation to the original problem can be obtained by including additional terms but explicit computation has shown that, for our purposes, this level of accuracy is sufficient.

The final formula we need to derive is that for $$\langle \sigma, \vec{y} | p^2 | \sigma, \vec{x} \rangle = \langle \sigma | p^2 e^{-ip(\vec{x}-\vec{y})} | \sigma \rangle = \frac{(\vec{x}-\vec{y})^2}{2\sigma^2} e^{-(\vec{x}-\vec{y})^2/4\sigma^2} \quad (31)$$

With these preliminaries behind us, it only remains to describe the mechanics of the DQC evolution process, where we evaluate the Hamiltonian truncated to an n×n matrix in the non-orthonormal basis of shifted Gaussians:

$$H_{i,j} = \langle \sigma, \vec{x}_i | \hat{H} | \sigma, \vec{x}_j \rangle \quad (32)$$

The time evolution of our original states is computed by applying the exponential of the truncated Hamiltonian to the state in question; i.e.

$$|\sigma, \vec{x}\rangle(t) = e^{-iHt}|\sigma, \vec{x}\rangle.$$

Computing the exponential of the truncated operator is quite simple, except for one subtlety: we have defined H by its matrix elements between a non-orthonormal set of states. Hence, to perform the exponentiation, we first find the eigenvectors and eigenvalues of the metric $N_{i,j}$ and use them to compute the matrix $N_{i,j}^{-1/2}$. If our original set of states is not linearly independent, then $N_{i,j}$ will have some zero eigenvalues. Clearly, we throw their corresponding eigenvectors away when computing $N_{i,j}^{-1/2}$. In practice we discard all vectors whose eigenvalue is smaller than a predetermined threshold (e.g., $10^{-5}$) selected to balance numerical efficiency and accuracy.

Then we construct the transformed $$H_{i,j}^{tr} = \sum_{k,l} N_{i,k}^{-1/2} H_{k,l} N_{l,j}^{-1/2} \quad (33)$$

Now we can construct the exponential of this operator by simply finding its eigenvectors and eigenvalues. In order to compute the time evolution of one of the original states we simply write them in terms of the orthonormal basis.

The only step which remains is to explain how we compute the expectation values of the operator x as functions of time: we first construct, for each component, the operator $$X_{i,j} = \langle \sigma, \vec{x}_i | x | \sigma, \vec{x}_j \rangle \quad (34)$$

and use $N_{i,j}^{-1/2}$ to put this into the same basis in which we exponeniate H; i.e., construct $$X_{i,j} = \sum_{k,l} N_{i,k}^{-1/2} X_{k,l} N_{l,j}^{-1/2}. \tag{35}$$

What is claimed is:

1. A method for data clustering, comprising:
obtaining a set of source data using a dynamic quantum clustering server system, where the set of source data comprises a data dimensionality;
assigning a subset of the set of source data to a representational space using the dynamic quantum clustering server system, where the representational space allows a distance between pieces of data in the set of source data to be measured;
constructing a potential function based on the representational space and the set of source data using the dynamic quantum clustering server system;
computing a frame of animation for the set of source data over a time interval using the dynamic quantum clustering server system, wherein computing the frame of animation includes:
associating data points from the set of source data with states, wherein the states include initial wave functions;
computing kinetic and potential energies for each initial wave function;
determining updated wave functions using the time-dependent Schrodinger equation based on the kinetic and potential energies of each initial wave function;
determining at least one trajectory for the time interval based upon the updated wave functions; and
constructing the frame of animation based on the at least one trajectory;
evaluating the computed frame of animation for the set of source data over a time period using the dynamic quantum clustering server system, where the evaluation identifies data clusters comprising a subset of the set of source data within the computed frame of animation;
generating a representation of the computed frame of animation using the dynamic quantum clustering server system; and
transmitting the generated representation to a client device configured to display the generated representation by providing an interactive visual animation of point positions at one or more selected times.

2. The method of claim 1, further comprising labeling the data clusters using the dynamic quantum clustering server system.

3. The method of claim 2, wherein the data clusters are labeled with color information using the dynamic quantum clustering server system.

4. The method of claim 1, further comprising preprocessing the set of source data points to reduce the dimensionality of the set of source data using the dynamic quantum clustering server system.

5. The method of claim 4, wherein the set of source data is preprocessed using singular value decomposition.

6. The method of claim 4, further comprising generating a matrix representation of the obtained source data using the dynamic quantum clustering server system, where the matrix representation is utilized in place of the obtained source data.

7. The method of claim 1, wherein the potential function is determined such that a quantum mechanical ground state of the potential function is equal to the sum of the initial states of the potential function.

8. The method of claim 7, wherein the potential function is constructed as a sum of Gaussian functions centered at each data point in the set of source data.

9. The method of claim 7, wherein computing the frame of animation comprises computing an expectation value of a quantum mechanical position operator using the dynamic quantum clustering server system.

10. The method of claim 1, further comprising obtaining labeling data using the dynamic quantum clustering server system, where the labeling data identifies one or more features of the data clusters.

11. The method of claim 1, wherein the representational space comprises a Hilbert space.

12. The method of claim 1, wherein the potential function satisfies a time-independent Schrödinger equation.

13. The method of claim 1, wherein:
the potential function comprises a set of initial states; and
the cardinality of the set of initial states is based on the number of data points in the set of source data.

14. The method of claim 1, further comprising:
generating filtered data based on the strongly clustered data using the dynamic quantum clustering server system; and
identifying features associated with the strongly clustered data using the dynamic quantum clustering server system.

15. The method of claim 14, further comprising labeling the strongly clustered data based on the identified features using the dynamic quantum clustering server system.

16. The method of claim 14, further comprising:
identifying the points of data in the set of source data that are present in at least one piece of strongly clustered data using the dynamic quantum clustering server system;
computing the distance between each pair of data points in the identified points of data using the dynamic quantum clustering server system; and
calculating a success metric based on the computed distances and the set of source data using the dynamic quantum clustering server system.

17. The method of claim 1, wherein the strongly clustered data is centered around a local minimum in the representational space.

18. A dynamic quantum clustering server system, comprising:
a processor; and
a memory storing a relationship identification application;
wherein the relationship identification application directs the processor to:
obtain a set of source data, where the set of source data comprises a data dimensionality;
assign a subset of the set of source data to a representational space, where the representational space allows a distance between pieces of data in the set of source data to be measured;
construct a potential function based on the representational space and the set of source data;
compute a frame of animation for the set of source data over a time interval, wherein computing the frame of animation includes:
associating data points from the set of source data with states, wherein the states include initial wave functions;
computing kinetic and potential energies for each initial wave function;

determining updated wave functions using the time-dependent Schrodinger equation based on the kinetic and potential energies of each initial wave function;

determining at least one trajectory for the time interval based upon the updated wave functions; and constructing the frame of animation based on the at least one trajectory;

evaluate the computed frame of animation for the set of source data, where the evaluation identifies data clusters comprising a subset of the set of source data within the computed frame of animation;

generate a representation of the computed frame of animation; and transmit the generated representation to a client device configured to display the generated representation by providing an interactive visual animation of point positions at one or more selected times.

\* \* \* \* \*